(12) United States Patent
Salg

(10) Patent No.: US 6,620,072 B1
(45) Date of Patent: Sep. 16, 2003

(54) DIFFERENTIAL GEAR

(75) Inventor: Ditmar Salg, Röhrnbach (DE)

(73) Assignee: ZF Friedrichshafen AG, Friedrichshafen (DE)

(*) Notice: Subject to any disclaimer, the term of this patent is extended or adjusted under 35 U.S.C. 154(b) by 21 days.

(21) Appl. No.: 10/019,088

(22) PCT Filed: Jun. 17, 2000

(86) PCT No.: PCT/EP00/05604
§ 371 (c)(1),
(2), (4) Date: Dec. 19, 2001

(87) PCT Pub. No.: WO01/01019
PCT Pub. Date: Jan. 4, 2001

(30) Foreign Application Priority Data

Jun. 25, 1999 (DE) .......................................... 199 29 070

(51) Int. Cl.⁷ ............................................... F16H 48/08
(52) U.S. Cl. ....................................................... 475/231
(58) Field of Search .............................. 475/231, 234, 475/239, 249

(56) References Cited

U.S. PATENT DOCUMENTS

| | | | | |
|---|---|---|---|---|
| 1,161,057 A | * | 11/1915 | Long | 475/231 |
| 1,413,855 A | * | 4/1922 | Krohn | 475/249 |
| 1,454,578 A | * | 5/1923 | Towler | 475/249 |
| 1,859,245 A | * | 5/1932 | Remington | 475/249 |
| 2,913,928 A | | 11/1959 | Double | |
| 3,548,683 A | * | 12/1970 | Fisher | 475/231 |
| 3,788,166 A | | 1/1974 | Hart et al. | |
| 3,899,938 A | * | 8/1975 | Crabb | 475/249 |
| 3,955,443 A | | 5/1976 | Estrada | |
| 4,169,394 A | * | 10/1979 | Estrada | 475/234 |
| 4,526,063 A | | 7/1985 | Oster | |
| 4,644,823 A | | 2/1987 | Mueller | |
| 5,520,589 A | | 5/1996 | Dewald et al. | 475/160 |
| 5,527,229 A | * | 6/1996 | Ishihara et al. | 475/249 |
| 5,624,343 A | | 4/1997 | Krisher | 475/160 |
| 6,010,424 A | * | 1/2000 | Irwin | 475/231 |
| 6,056,663 A | * | 5/2000 | Fett | 475/231 |

FOREIGN PATENT DOCUMENTS

| | | | | |
|---|---|---|---|---|
| DE | 32 12 495 C2 | 8/1985 | ........... | F16H/1/445 |
| DE | 195 47 980 A1 | 7/1996 | ........... | F16H/48/06 |
| DE | 38 39 787 C2 | 3/1998 | ........... | F16H/48/30 |
| EP | 0 236 650 | * 9/1987 | ................. | 475/231 |
| EP | 0 733 832 A1 | 9/1996 | ........... | F16H/48/28 |
| JP | 61-166725 | * 7/1986 | ................. | 475/231 |
| JP | 2-242274 | * 1/1990 | ................. | 475/231 |

* cited by examiner

Primary Examiner—Sherry Estremsky
(74) Attorney, Agent, or Firm—Davis & Bujold, P.L.L.C.

(57) ABSTRACT

Proposed is a locking differential drive, in which, between a first side of a differential cage (3) and a cover (4) a crown wheel (2) is located, which is turnably connected with the cover (4) and the differential cage (3), and the radial extent of which crown wheel (2) is less than that of the opening (9) of the differential cage (3), which said opening serves for the installation of differential bevel gears (10, 11). The crown wheel (2) exhibits two contact faces, of which a first contact face (7) serves as a seat for a clutch (6) of an externally lockable differential drive and a second contact face (8) serves as a seat for a clutch (17) of a self-actuating lockable differential drive. In this way, the same crown wheel (2) and the same differential cage (3) can be employed both for an externally lockable differential drive as well as a self actuating differential drive.

12 Claims, 2 Drawing Sheets

DIFFERENTIAL GEAR

FIELD OF THE INVENTION

Differential gear drives are used frequently in motor vehicles, in order to compensate for different rates of rotation of driven wheels. In the case of lockable differentials, two kinds are generally differentiated between. One is a lockable differential, which is put into the locked state by an external activation apparatus, in which, by the activation of the said external activation apparatus, the differential action of the differential can be partially or fully withheld. The other is the self-acting, locking differential. In the case of the self acting differential, the locking action is based on interior friction, which opposes the differential motion. Usually, for both kinds of the differential, lamellar clutches are employed for the suspension of the differential activity.

BACKGROUND OF THE INVENTION

DE 195 47 980 A1 discloses a differential gear drive, which develops, by means of the varied speed of rotation of the driven wheels, a braking torque. This said torque partially suspends the differential action of the differential drive. In this case, the differential cage comprises two parts, which are connected by means of bolts. A bevel gear, which is driven by a drive pinion, is connected to the differential cage by an additional bolt fastening.

DE 38 39 787 C2 makes known a differential drive, in which case the differential effect of the said drive can be suspended by means of an external activation of an activation apparatus. The differential cage of the differential drive consists of two parts, wherein one part of the differential cage is driven. The fastening of the drive gear is not shown.

The purpose of the present invention is to create a differential drive, wherein the drive pinion and the driven bevel gear, which is connected to the differential cage, as well as a principal component of the differential cage and the therein employed differential bevel gears, can serve as,an external lockable differential drive as well as a self-acting lockable differential drive.

SUMMARY OF THE INVENTION

In accordance with the invention, the driven bevel gear, which is connected with the differential cage, is so designed, that it possesses two, oppositely disposed contact faces. Of these two, the first contact face serves as seat for the clutch lamina which serve for the locking of the differential motion by externally activated locking means. The second contact face, which lies opposite the first contact face, serves as a seat for a clutch in a self-locking differential drive. The differential cage possesses on the one hand, an opening, through which the installation of the differential gears is made and which also possesses a space in which the clutches, in the case of a self-locking differential drive can be installed and on the other hand, possesses a first contact face for the bearing of the differential cage in the axle housing. The drive side differential bevel gears, which are to be found in the differential cage, possess fastening points for the securing of the inner laminae of the clutches for locking the differential drive. The driven bevel gear is so fastened as to turn in common with the differential cage and partially closes the opening of the differential cage, whereby, the second contact face, which serves as a seat for the clutch of the self-locking differential drive, can extend itself into the said differential cage. The driven bevel gear, which, as said, is rotatably affixed to the differential cage, is located between the differential cage and a cover, which cover is affixed by fastening elements with both the driven bevel gear and the differential cage, and possesses moreover a second location for the setting of the differential drive in bearings in the axle housing. While the driven bevel gear is placed between the cover and the differential cage, it becomes possible, in accord with the individual circumstances, to permit the clutches to seat upon the said contact faces of the bevel gear. Different covers are used, if the lockable differential drive is to function as a self-locking drive or be activated by an external activation apparatus. By means of this arrangement, it is possible, in the case of a self-locking differential drive and also in the case of an externally activated locking differential drive, to make the principal components of the differential cage, the differential bevel gears in the differential cage, and the driven bevel gear, without any changes. If a split axle housing is employed, which, can, possibly, encapsulate the differential drive, then, additionally, this part, which extends over the differential drive, can also, for both kinds of differential drives, be made and shaped the same. By this means, it is possible to create an assembly method, in which both kinds of differential drives, with many identical components can be manufactured.

BRIEF DESCRIPTION OF THE DRAWINGS

The invention will now be described, by way of example, with reference to the accompanying drawings in which.

DETAILED DESCRIPTION OF THE INVENTION

Figure 1:
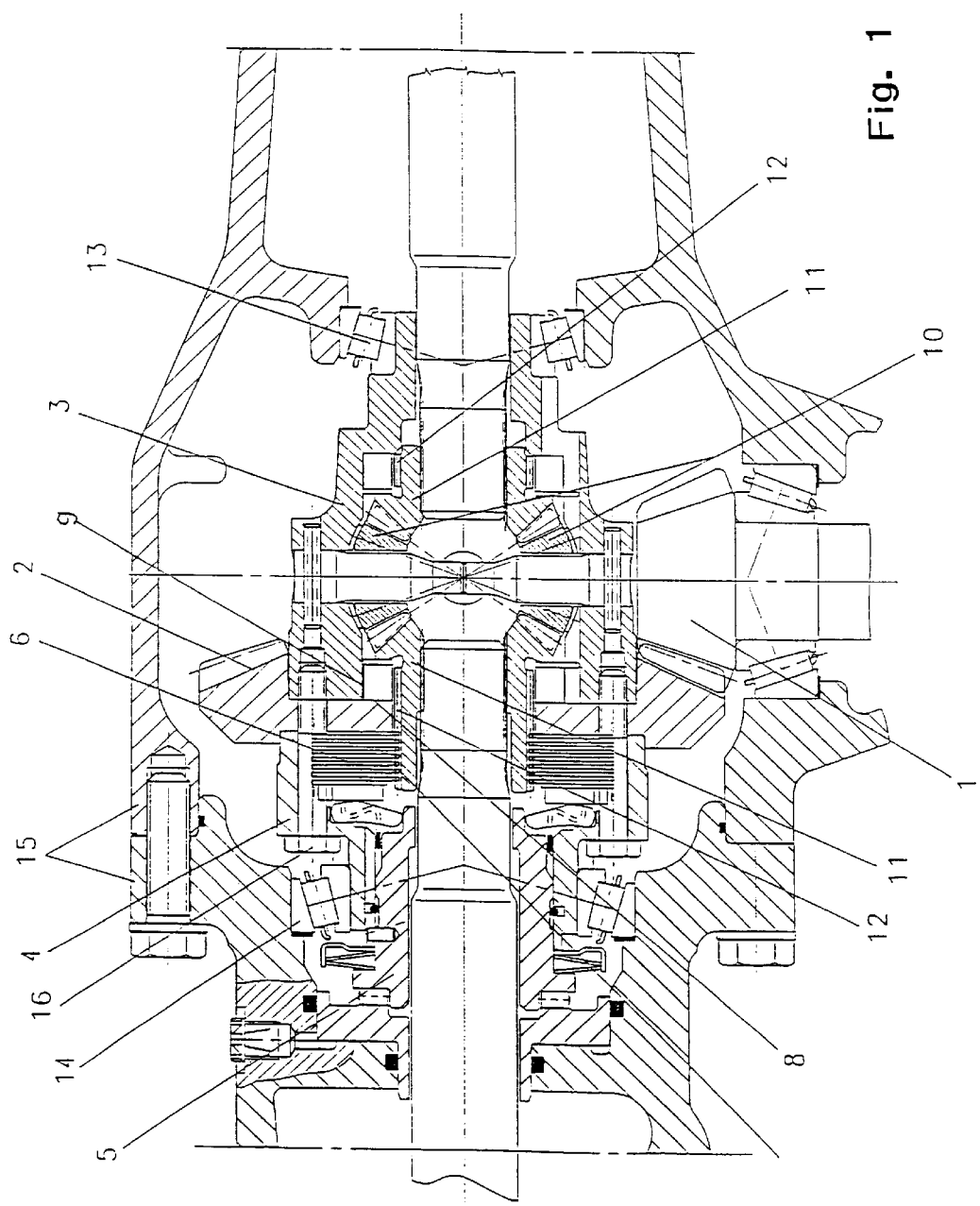
FIG. 1 a locking differential drive, which can be locked by external activation of an activation apparatus, and FIG. 2 a locking differential drive, which, reduces the differential effect in a self-acting manner by means of variation in the speed of rotation of the driven wheels.
Figure 2:
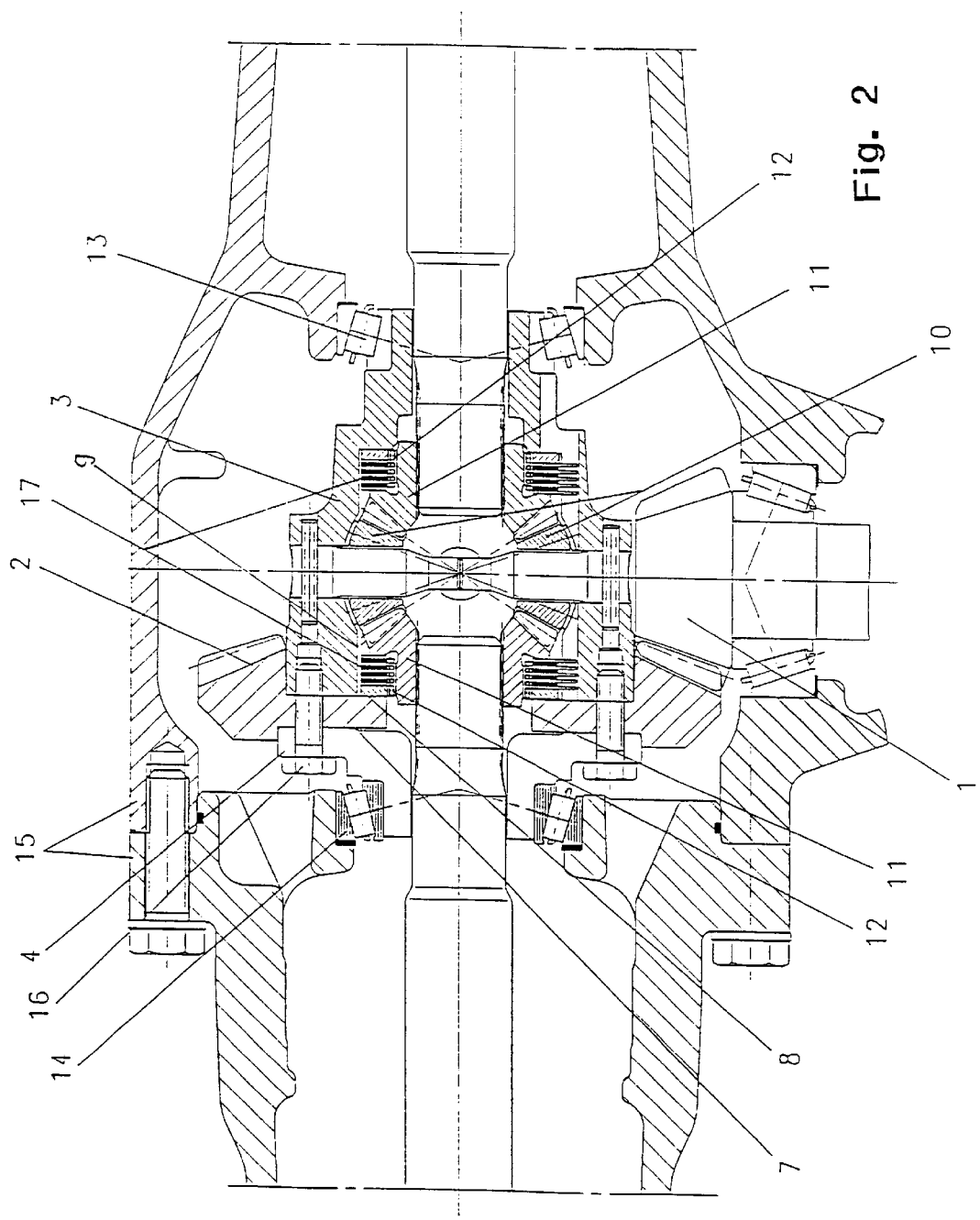

FIG. 1:

A drive pinion 1 drives a crown wheel 2, which is affixed to rotate with the differential cage 3. The crown wheel 32 is placed between a differential cage 3 and a cover 4. By means of an external, pressure connected, activation means 5, upon application of pressure thereon, an axial force is exerted on the clutch 6, which said clutch seats itself against a first contact face 7 of the crown wheel 2. The crown wheel 2 possesses a second contact face 8, with which the crown wheel 2 lies against the differential cage 3. The differential cage 3 possesses, one opening 9, through which the differential bevel gears 10 may be inserted.

The output side differential bevel gears 11 possess, respectively, a structural member 12, which serves for the reception of the lamina of the clutch 6. The differential cage 3 is, first, carried in bearings by a bearing set 13 and, second, by a bearing set 14, both being located in the axle housing 15. The cover 4, the crown wheel 2, and the differential cage 3 are so fastened by securing means as to turn with each other.

FIG. 2:

A drive pinion 1 drives a crown wheel 2, which is connected to a differential cage 3. The crown wheel 2 possesses two contact faces, a first contact face 7 and a second contact face 8, whereby the second contact face 8 serves as a seat for the clutch 17 and also as a seat for the crown wheel 2 on the differential cage 3. The differential gears 11, which can be mounted with the differential bevel gears 10 through an opening 9 in the differential cage 3, possess a structural element 12, on which the clutch 17 is placed. The differential cage 3 possesses, first, a bearing 13, and is, second, turnably secured by a fastening means 16 to a cover 4 and the crown wheel 2, whereby the cover 4 possesses a bearing set 14. By means of the bearing sets 13 and 14, the differential drive is carried on bearings in the axle housing 15. Inasmuch as the crown wheel 2, in its radial extent, is less than the radial extent of the opening 9 of the differential cage 3, it is possible to make use of the crown wheel 2 as a contact face for the clutch 17. By means of the difference of the differential bevel gears 11, a friction in the clutches 17 is produced, which minimizes the differential effect of the differential drive.

Reference Numbers and Items

1 Drive pinion
2 Crown wheel, also known as ring gear
3 Differential cage,
4 Cover
5 Activation apparatus
6 Clutch
7 First contact face
8 Second contact face
9 Opening in differential cage
10 Differential bevel gear
11 Differential bevel gear
12 Structural element
13 Bearing
14 Bearing
15 Axle housing
16 Fastening means
17 Clutch

What is claimed is:

1. A differential drive, comprising
   rotatable differential housing including a differential cage (3), and a cover (4),
   a crown wheel (2) is secured on the cover, and a drive pinion (1) which drives the crown wheel (2), and
   at least one clutch (6, 17) for actuating one of a partial and a complete locking of a differential effect of the differential drive,
   the crown wheel (2) is located between the cover (4) and the differential cage (3) and is fast with the differential cage (3) and the cover (4), and
   the crown wheel (2) has a first and a second contact face (7, 8),
   the first contact face (7) of the crown wheel (2) serves as a seat for parts of the clutch (6), which can be activated to lock the differential effects of the differential drive by a locking apparatus, and
   the second contact face (8) of the crown wheel (2) serves as a seat on the differential cage (3).

2. The differential drive according to claim 1, wherein the differential cage (3) has on a first side an opening (9), through which differential gears (10, 11) can be installed and on a second side has a bearing arrangement (13).

3. The differential drive according to claim 2, wherein the opening (9) of the differential cage (3), through which the differential gears (10, 11) can be installed, is located proximal to the crown wheel (2).

4. The differential drive according to claim 1, wherein an inner radial extent of the contact faces (7, 8) of the crown wheel (2) is less than a radial extent of an opening (9) in a first side of the differential cage (3).

5. The differential drive according to claim 1, wherein the cover (4) with a first bearing (14) and the differential cage (3) with a second bearing (13) are secured in an axle housing (15).

6. A differential drive, comprising
   a rotatable differential housing including a differential cage (3), and a cover (4),
   a crown wheel (2) is secured on the cover (4) and a drive pinion (1) drives the crown wheel (2), and
   at least one clutch (6, 17) for actuating one of a partial and a complete locking of a differential effect of the differential drive, wherein
   the crown wheel (2) is located between the cover (4) and the differential cage (3) and is fast with the differential cage (3) and the cover (4),
   the crown wheel (2) has a first and a second contact face (7, 8), and
   the second contact face (8) of the crown wheel (2) serves as a seat for part of the clutch (17) which serves to produce a partial self-locking differential action of the differential drive, and the first contact face (7) of the crown wheel (2) serves as a seat for the cover (4).

7. A differential drive comprising:
   a rotatable differential housing including a differential cage (3) and a cover (4);
   a crown wheel (2) is secured to the cover (4) and a drive pinion (1) drives the crown wheel (2);
   at least one clutch (6, 17) for one of partial and complete locking of a differential effect of the differential drive; wherein
   the crown wheel (2) is located between the cover (4) and the differential cage (3) and is fast with the cover (4) and the differential cage (3);
   the crown wheel (2) has first and second contact faces (7, 8);
   the first contact face (7) of the crown wheel (2) serves as a seat for a portion of the clutch (6) which can be activated, by a locking apparatus, to lock the differential effect of the differential drive,
   the second contact face (8) of the crown wheel (2) serves as a seat for the differential cage (3), and
   an inner radial extent of the first and second contact faces (7, 8) of the crown wheel (2) is less than a radial extent of an opening (9) in a first side of the differential cage (3).

8. A differential drive comprising:
   a rotatable differential housing including a differential cage (3) and a cover (4);
   a crown wheel (2) is secured to the cover (4) and a drive pinion (1) drives the crown wheel (2);
   at least one clutch (6, 17) for one of partial and complete locking of a differential effect of the differential drive;
   wherein the crown wheel (2) is located between the cover (4) and the differential cage (3) and is fast with the cover (4) and the differential cage (3);
   the crown wheel (2) has first and second contact faces (7, 8);
   the second contact face (8) of the crown wheel (2) serves as a seat for part of the clutch (17) which serves to produce a partial self-locking action of the differential drive; and
   the first contact face (7) of the crown wheel (2) serves as a seat for the cover (4), and
   an inner radial extent of the first and second contact faces (7, 8) of the crown wheel (2) is less than a radial extent of an opening (9) in a first side of the differential cage (3).

9. A differential drive comprising:

a rotatable differential housing including a differential cage (3) and a cover (4);

a crown wheel (2) located between the cover (4) and the differential cage (3) and non-rotatably attached thereto; and a drive pinion (1) driving the crown wheel (2);

wherein the crown wheel (2) has first and second contact faces (7, 8), and the differential cage (3), the cover (4) and the crown wheel (2) are configured such that one of the first and second contact faces (7 or 8) of the crown, wheel (2) is a seat for a clutch (6 or 17) and the other of the first and second contact faces (8 or 7) of the crown wheel (2) is a seat for one of the differential cage (3) and the cover (4), whereby, upon operation of the clutch, the clutch is at least partially lock to provide a differential effect for the differential drive.

10. The differential drive according to claim 9, wherein the first contact face (7) of the crown wheel (2) is a seat for the clutch (6) and the second contact face (8) of the crown wheel (2) is a seat for the differential cage (3), and the clutch is actuated to completely lock the clutch (6) and provide the differential effect of the differential drive.

11. The differential drive according to claim 9, wherein the first contact face (7) of the crown wheel (2) is a seat for the cover (4) and the second contact face (8) of the crown wheel (2) is a seat for the clutch (17), and the clutch is actuated to only partially lock the clutch (17) and provide the differential effect of the differential drive.

12. The differential drive according to claim 11, wherein the differential drive includes a second clutch (17) which is located between the differential cage (3) a pair of differential gears (10, 11).

* * * * *

UNITED STATES PATENT AND TRADEMARK OFFICE
CERTIFICATE OF CORRECTION

PATENT NO. : 6,620,072 B1
DATED : September 16, 2003
INVENTOR(S) : Ditmar Salg

It is certified that error appears in the above-identified patent and that said Letters Patent is hereby corrected as shown below:

<u>Title page,</u>
Item [56], References Cited, FOREIGN PATENT DOCUMENTS, last reference, please replace "JP 2-242274" with -- JP 2-024274 --.

Signed and Sealed this

Thirtieth Day of December, 2003

JAMES E. ROGAN
*Director of the United States Patent and Trademark Office*